US011549426B2

(12) United States Patent
Demonie et al.

(10) Patent No.: US 11,549,426 B2
(45) Date of Patent: Jan. 10, 2023

(54) TRANSVERSELY ORIENTED COOLING PACKAGE FOR AN AGRICULTURAL HARVESTER

(71) Applicant: CNH Industrial America LLC, New Holland, PA (US)

(72) Inventors: Lode A. Demonie, Staden (BE); Frank R. G. Duquesne, Zwevegem (BE)

(73) Assignee: CNH Industrial America LLC, New Holland, PA (US)

( * ) Notice: Subject to any disclaimer, the term of this patent is extended or adjusted under 35 U.S.C. 154(b) by 25 days.

(21) Appl. No.: 15/535,340

(22) PCT Filed: Dec. 11, 2015

(86) PCT No.: PCT/EP2015/079357
§ 371 (c)(1),
(2) Date: Jun. 12, 2017

(87) PCT Pub. No.: WO2016/092056
PCT Pub. Date: Jun. 16, 2016

(65) Prior Publication Data
US 2017/0328264 A1    Nov. 16, 2017

(30) Foreign Application Priority Data

Dec. 12, 2014    (BE) .................................. 2014/0848

(51) Int. Cl.
*F01P 3/20*        (2006.01)
*A01D 41/12*    (2006.01)
(Continued)

(52) U.S. Cl.
CPC ................ *F01P 3/20* (2013.01); *A01D 41/12* (2013.01); *F01P 11/06* (2013.01); *F01P 11/12* (2013.01);
(Continued)

(58) Field of Classification Search
CPC .. F01P 3/20; F01P 11/12; A01D 41/12; A01D 41/1208; A01D 41/1252;
(Continued)

(56) References Cited

U.S. PATENT DOCUMENTS

| 4,339,014 A |   | 7/1982 | Berth et al. |
| 4,439,218 A | * | 3/1984 | Priepke ................. B01D 46/10 |
|             |   |        | 55/282.4 |

(Continued)

FOREIGN PATENT DOCUMENTS

| DE | 3842871 A1 | 6/1990 |
| DE | 10139315 A1 | 3/2003 |

(Continued)

OTHER PUBLICATIONS

International Search Report for PCT Application PCT/EP2015/79357 dated Feb. 5, 2016 (10 pages).

(Continued)

*Primary Examiner* — Lindsay M Low
*Assistant Examiner* — Omar Morales
(74) *Attorney, Agent, or Firm* — Patrick Sheldrake; Peter Zacharias

(57) ABSTRACT

An agricultural harvester includes an IC engine, a grain tank, and a fluid cooling system for at least one component onboard the agricultural harvester. The fluid cooling system has a cooling package positioned between the IC engine and the grain tank. The cooling package includes a housing, and a plurality of cooling units arranged in a side-to-side manner within the housing, transverse to a fore-aft direction of the harvester.

18 Claims, 7 Drawing Sheets

(51) Int. Cl.
*F02B 29/04* (2006.01)
*F01P 11/06* (2006.01)
*F01P 11/12* (2006.01)
*F01P 3/18* (2006.01)
*F01P 5/10* (2006.01)

(52) U.S. Cl.
CPC .... *F02B 29/0475* (2013.01); *F01P 2003/185* (2013.01); *F01P 2005/105* (2013.01); *F01P 2011/061* (2013.01); *F01P 2011/063* (2013.01); *F02B 29/0412* (2013.01); *Y02T 10/12* (2013.01)

(58) Field of Classification Search
CPC ............... A01D 41/133; F02B 29/0475; F02B 29/0412; A01F 12/442; A01F 12/444; A01F 12/60
USPC ...................................................... 123/41.31
See application file for complete search history.

(56) References Cited

U.S. PATENT DOCUMENTS

| | | | | |
|---|---|---|---|---|
| 4,514,201 | A | * | 4/1985 | Brown .................... B01D 46/26 180/68.1 |
| 4,542,785 | A | * | 9/1985 | Bagnall .................... F01P 11/06 165/119 |
| 4,874,411 | A | * | 10/1989 | Snauwaert ............. B01D 46/26 55/290 |
| 5,595,537 | A | | 1/1997 | Jungemann et al. |
| 6,193,772 | B1 | * | 2/2001 | Wiefel ..................... F01P 11/12 55/283 |
| 8,596,396 | B1 | | 12/2013 | Ricketts |
| 2007/0006827 | A1 | | 1/2007 | Chaney et al. |
| 2007/0017561 | A1 | | 8/2007 | Roth et al. |
| 2010/0024747 | A1 | | 2/2010 | Jüptner |
| 2010/0275587 | A1 | | 11/2010 | Schindler et al. |
| 2012/0247709 | A1 | * | 10/2012 | Soldan ................... F28F 27/00 165/11.1 |

FOREIGN PATENT DOCUMENTS

| | | |
|---|---|---|
| DE | 10228213 A1 | 2/2004 |
| DE | 19857681 A1 | 6/2006 |
| DE | 20200901428 U1 | 2/2010 |
| DE | 102011006350 A1 | 10/2012 |
| EP | 1262645 A2 | 12/2002 |
| EP | 1770255 A1 | 4/2007 |
| EP | 2368417 A1 | 9/2011 |
| GB | 727532 A | 4/1955 |
| JP | 8163916 A | 6/1996 |
| JP | 10089068 A | 4/1998 |
| JP | 2010161996 A | 7/2010 |
| RU | 2188327 C1 | 8/2002 |

OTHER PUBLICATIONS

Extended European Search Report for Belgian Application EP2014/0848 dated Jul. 31, 2015 (10 pages).

* cited by examiner

TRANSVERSELY ORIENTED COOLING PACKAGE FOR AN AGRICULTURAL HARVESTER

CROSS REFERENCE TO RELATED APPLICATION

This application is the National Stage of International Application No. PCT/EP2015/079357 filed Dec. 11, 2015, which claims priority to Belgian Application No. 2014/0848 filed Dec. 12, 2014, the contents of which are incorporated herein by reference.

BACKGROUND OF THE INVENTION

The present invention relates to agricultural harvesters, and, more specifically to fluid cooling systems used with such harvesters.

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Agricultural combines tend to become larger and more sophisticated over time. As the size of the combines increase, the power requirements also increase. More power means more heat generated onboard the combine. Onboard components such as an internal combustion (IC) engine, hydraulic circuits, an air conditioning (A/C) circuit, etc. have internal fluids that require cooling. To this end, combines typically include several discrete fluid coolers located at various convenient locations onboard the combine. For example, the radiator for the IC engine typically is positioned along a side of the combine, with a rotating screen positioned in the vertical side wall of the combine. As another example, the A/C circuit can be located in the roof of the operator cab. Such coolers are effective to cool the respective components, but take up additional room onboard the combine, and may not be located at the best location to avoid chaff, dust, etc. from plugging the screen or radiator.

What is needed in the art is a cooling system for an agricultural harvester that effectively cools various fluids onboard the harvester, is easy to install, and avoids chaff, dust, etc.

SUMMARY OF THE INVENTION

The present invention provides a cooling system with multiple cooling units which are arranged laterally across the combine, between the IC engine and the grain tank.

The invention in one form is directed to an agricultural harvester, including an IC engine, a grain tank, and a fluid cooling system for at least one component onboard the agricultural harvester. The fluid cooling system is characterized in that a cooling package is positioned between the IC engine and the grain tank. The cooling package includes a housing, and a plurality of cooling units arranged in a side-to-side manner within the housing, transverse to a fore-aft direction of the harvester.

An advantage of the present invention is that the cooling system can be installed as an integral unit onboard the combine.

Another advantage is that the cooling system is configured and located onboard the combine so as to effectively avoid buildup of chaff, dirt, etc. at the inlet to the cooling system.

Yet another advantage is that the cooling system does not affect the overall aesthetic appearance of the combine.

A further advantage is that airflow from the output side of the cooling system can be used to clean components onboard the combine.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-aft direction of the agricultural harvester and are equally not to be construed as limiting.

Figure 1:
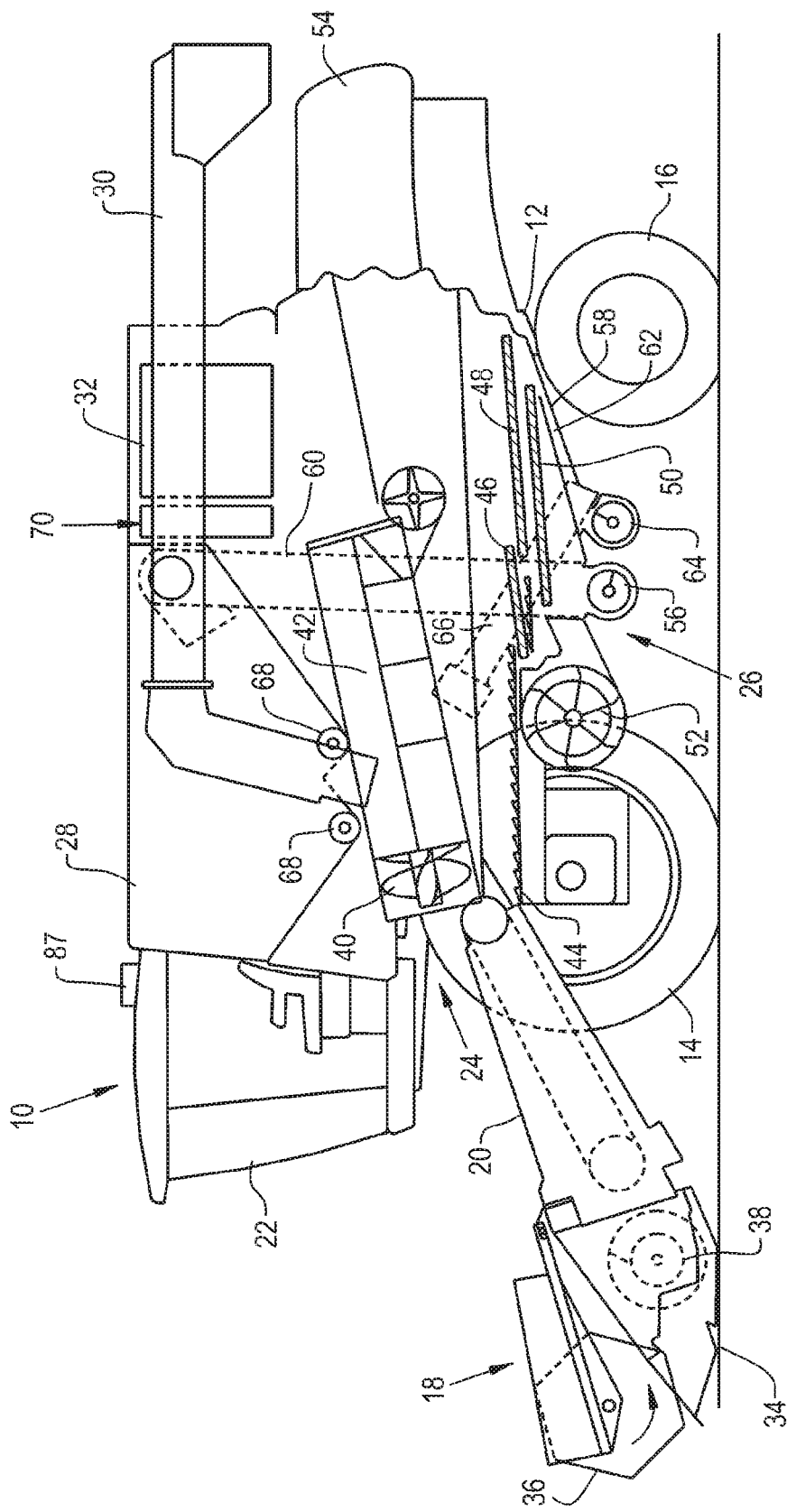
FIG. 1 is a side view of an embodiment of an agricultural harvester in the form of a combine, which includes an embodiment of a cooling system of the present invention.
Figure 2:
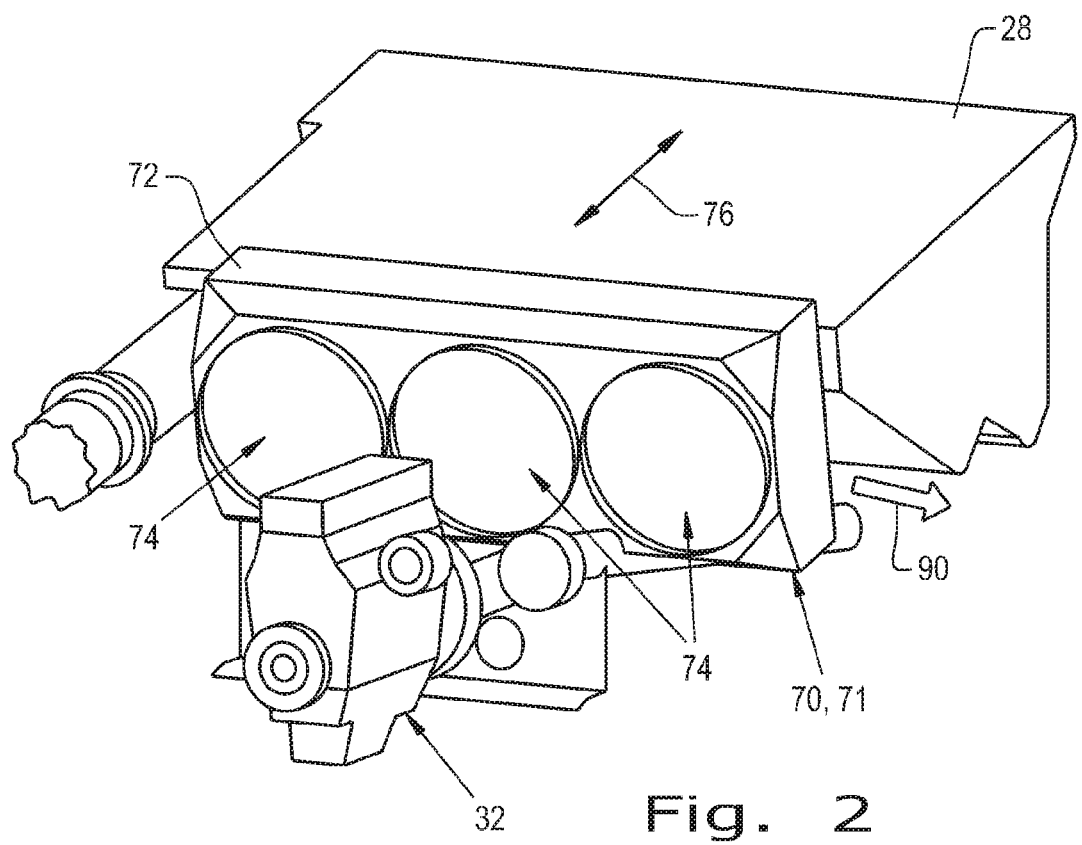
FIG. 2 is a side view of a portion of the internal components of the combine shown in FIG. 1, including the grain tank, IC engine and cooling system shown in FIG. 1.
Figure 3:
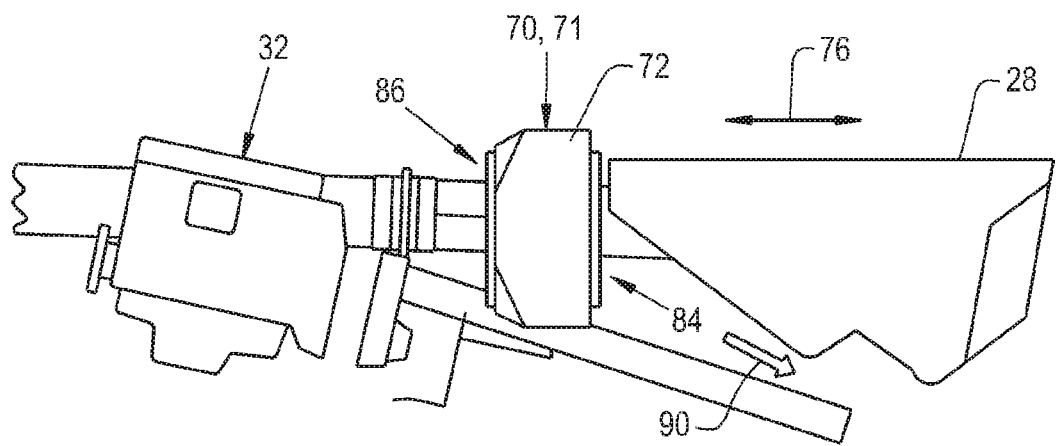
FIG. 3 is a side view of the internal components shown in FIG. 2.
Figure 4:
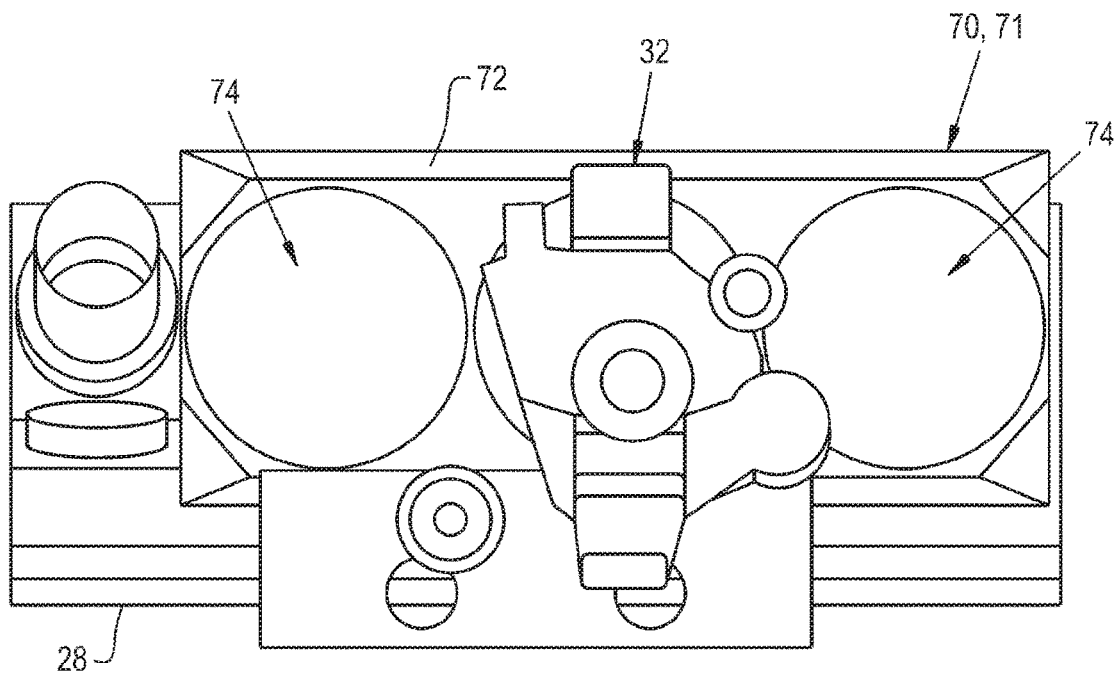
FIG. 4 is another side view of the internal components shown in FIGS. 2 and 3, taken from the left side of the view shown in FIG. 3.
Figure 5:
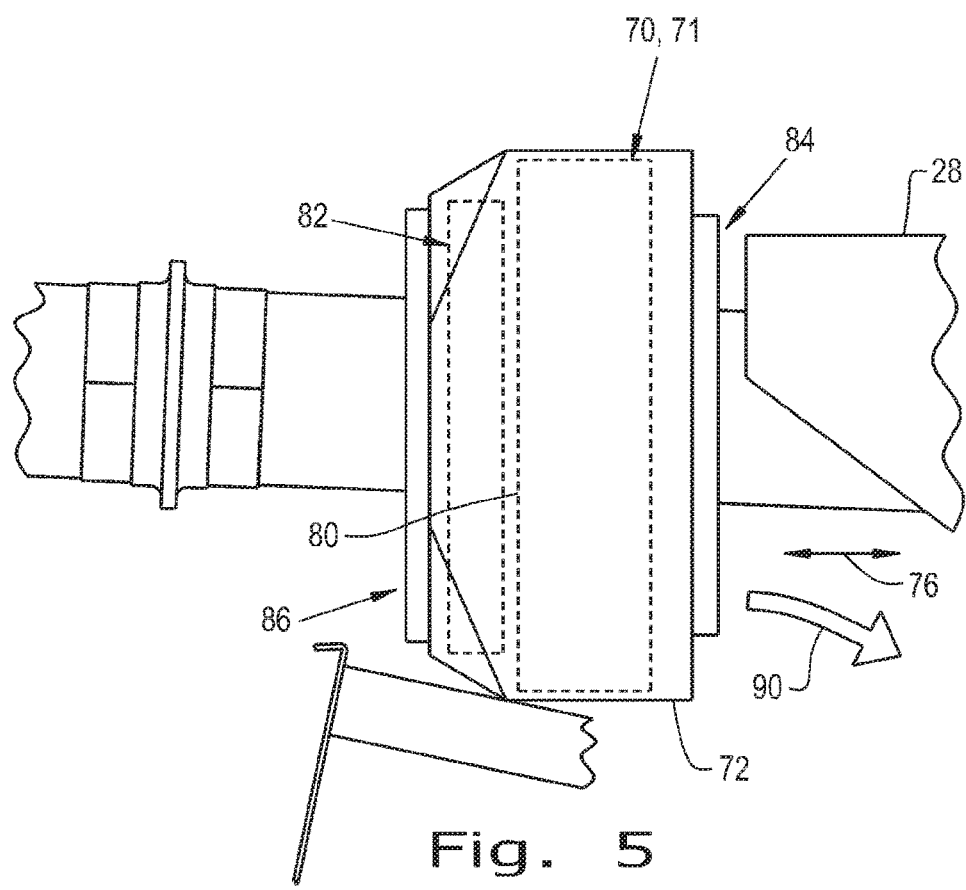
FIG. 5 is an end view of the cooling package forming part of the cooling system shown in FIGS. 2-4.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. Cross augers 68 at the bottom of grain tank 28 convey the clean grain within grain tank 28 to unloading auger 30 for discharge from combine 10.

According to an aspect of the present invention, combine 10 includes a cooling system 70 for cooling at least one component onboard the combine 10 (FIGS. 2-7). For example, the cooling system 70 can be used to cool the IC engine 32, exhaust and combustion gases associated with the IC engine 32, a hydraulic circuit (not shown), an air conditioning (A/C) circuit associated (not shown) with the operator cab 22, and/or other fluid carrying components onboard the combine 10.

The cooling system 70 is in the form of an integral cooling package 71 that is positioned between the IC engine 32 and the grain tank 28. The cooling package 71 includes a housing 72, and a plurality of cooling units 74 arranged in a side-to-side manner within the housing 72, transverse to a fore-aft direction 76 of the combine 10. Each cooling unit 74 generally includes a screen 78, a fluid cooler 80 and a fan 82. The screen 78 is at the inlet 84 of the corresponding cooling unit 74 adjacent to the grain tank 28, and the fan 82 is at the outlet 86 of the corresponding cooling unit 74 adjacent to the IC engine 32. The inlet 84 allows air to be drawn into the respective cooling unit 74, and the outlet 86 allows air to be exhausted from the respective cooling unit 74.

In the illustrated embodiment, the IC engine 32 is located rearward of the grain tank 28. Thus, the inlet 84 is located at the front surface (not numbered) of the cooling package 71 which faces toward the rear surface the grain tank 28. Conversely, the outlet 86 is located at the rear surface (not numbered) of the cooling package 71 which faces toward the front surface the IC engine 32. In the event that the IC engine 32 is located below or in front of the grain tank 28, then the inlet/front surface of the cooling package 71 can face toward the bottom or front surface, respectively, of the grain tank 28.

Each fluid cooler 80 is configured for cooling a corresponding type of fluid, such as a cooling fluid for an IC engine, hydraulic oil in a hydraulic power circuit, a refrigerant fluid used in an A/C circuit, etc. The fluid coolers can be configured with any combination of cooling circuits, and can all be the same, partially the same, or all different. In the event that one of more of the fluid coolers 80 are configured different relative to each other, then those cooling circuits are likely independent from each other. However, if multiple fluid coolers are configured the same, then those cooling circuits can be independent from each other or can be coupled together in series or parallel. In the illustrated embodiment, the three fluid coolers 80 are each assumed to be configured differently from each other and independent from each other. One fluid cooler 80 is configured as a radiator for the IC engine 32, another fluid cooler 80 is configured as an oil cooler for a hydraulic circuit, and the third fluid cooler 80 is configured as a heat exchange coil for an A/C circuit 87 associated with the operator cab 22. The fluid coolers 80 can also be configured as other types of fluid coolers, such as an intercooler or an aftercooler.

Figure 8:
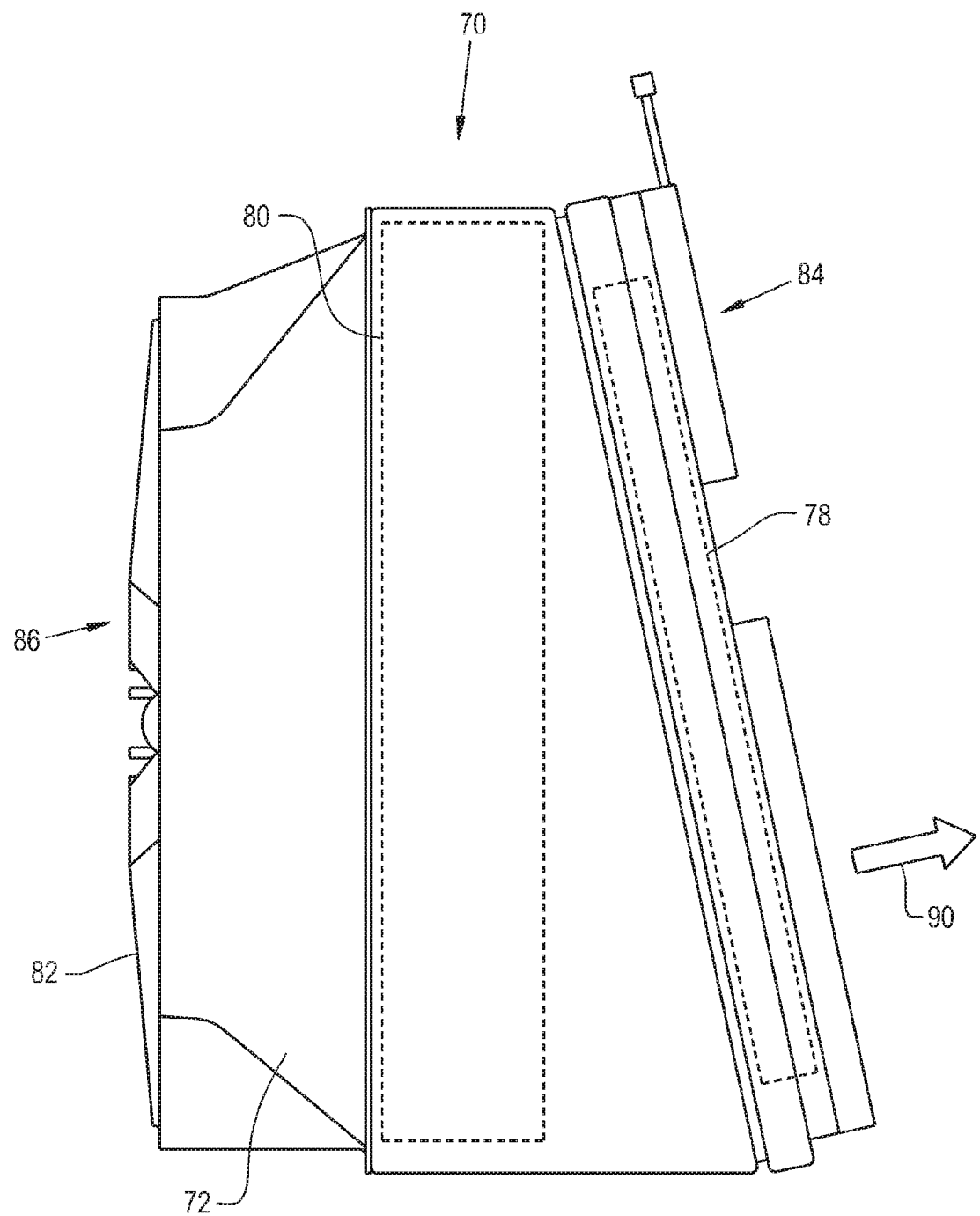
FIG. 8 is a side sectional view through another embodiment of a cooling package similar to the embodiment shown in FIGS. 5-7, with the inlet side slightly tilted.

Each screen 78 functions as a coarse filter to filter out dust, chaff, etc. from entering the corresponding cooling unit 74. In the illustrated embodiment, each screen 78 is configured as a rotating screen which is positioned generally vertical (FIGS. 3-7) or at an acute angle to the vertical (FIG. 8). Each rotating screen 78 can include a cleaner 88 which removes chaff, dirt, etc. from the screen as it rotates. Each screen 78 can also be configured to be movable toward and away from the respective cooling unit 74 for cleaning of and access to the respective cooling unit 74 (see FIG. 6). The screen 78 can be manually movable or can be movable using a suitable powered actuator, such as a pneumatic actuator or an electric motor and gear arrangement.

Each fan 82 is configured for moving air through the respective cooling unit 74 for effective liquid-to-air cooling. The rotational speed, blade pitch angle, etc. can of course vary, depending on the particular needs of the cooling unit 74. The air flow on the outlet side of the cooling unit 74 can be used for cooling and/or cleaning an area onboard the combine 10. For example, air from the outlet 86 of the cooling unit 74 configured as a radiator can be used to both cool, clean and inhibit buildup of dirt and chaff on the IC engine 32.

Figure 6:
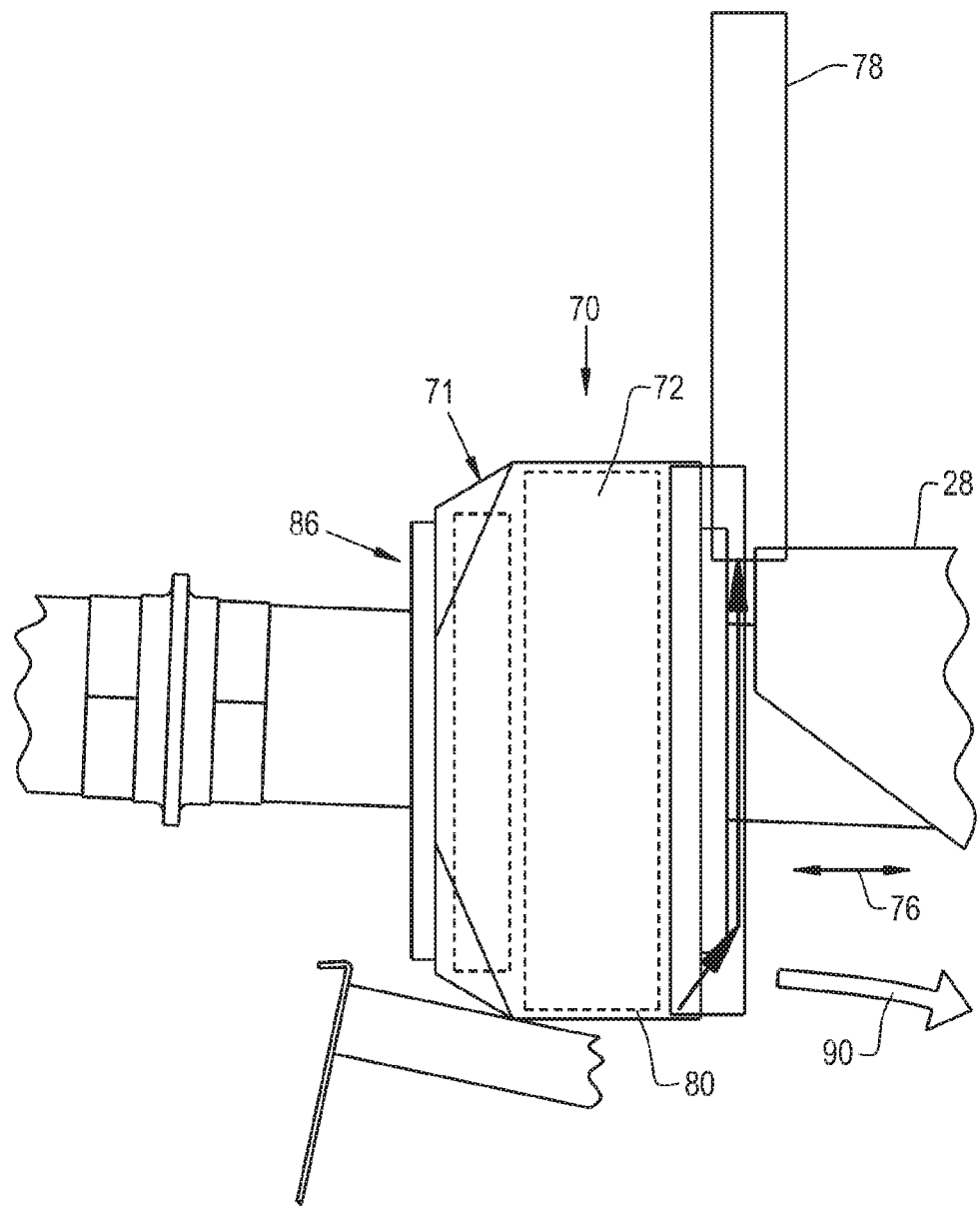
FIG. 6 is another end view of the cooling package shown in FIG. 5, with the rotating screen cover in a raised position.
Figure 7:
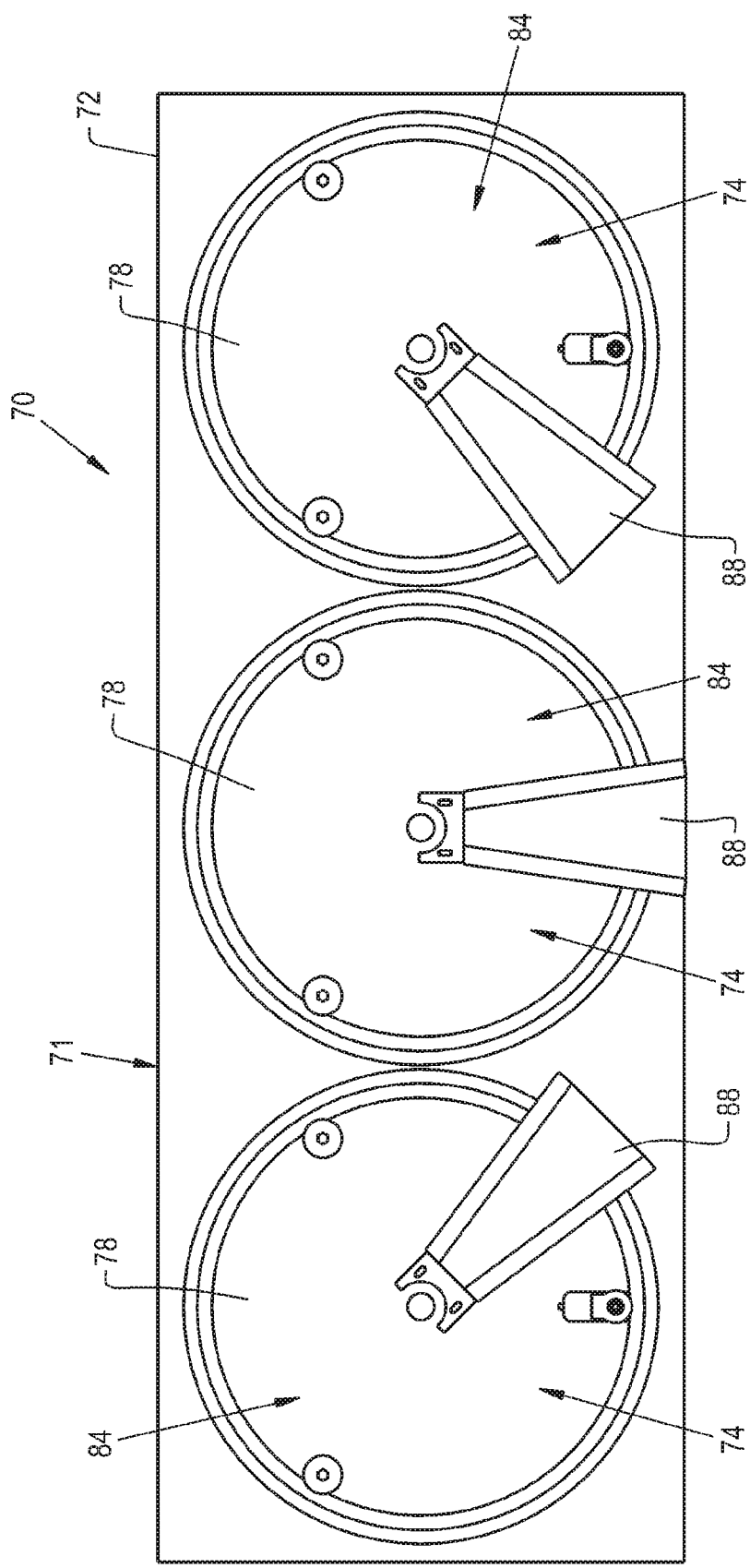
FIG. 7 is a side view of the cooling package shown in FIGS. 5 and 6.

One or more of the fans 82 can also be configured for reversal of the air flow direction through the corresponding cooling unit 74. This can be accomplished using a reversible motor, or the blades can have a varying pitch to reverse the air flow direction. When the air is then flowing in the opposite direction, such that the inlet 84 is in fact the outlet of the cooling unit 74, then this flow of air can be used to clean the screen 78. Alternatively, the reverse flowing air can be used to clean and/or cool other parts of the combine 10. For example, referring to FIGS. 2 and 3, air flowing in a reverse direction 90 can be directed under the grain tank 28 toward the outer surface of the concaves for cleaning this area within the combine 10. The screens can be moved away from the cooling unit 74, as shown in FIG. 6, to allow the air to flow at a higher flow rate and/or velocity for better cleaning. The reverse flowing air can also be used to clean a different selected area within the combine 10. To that end, suitable plenums, channels, guides, etc. (not shown) can be used to direct the air to a selected location onboard the combine 10.

Figure 9:
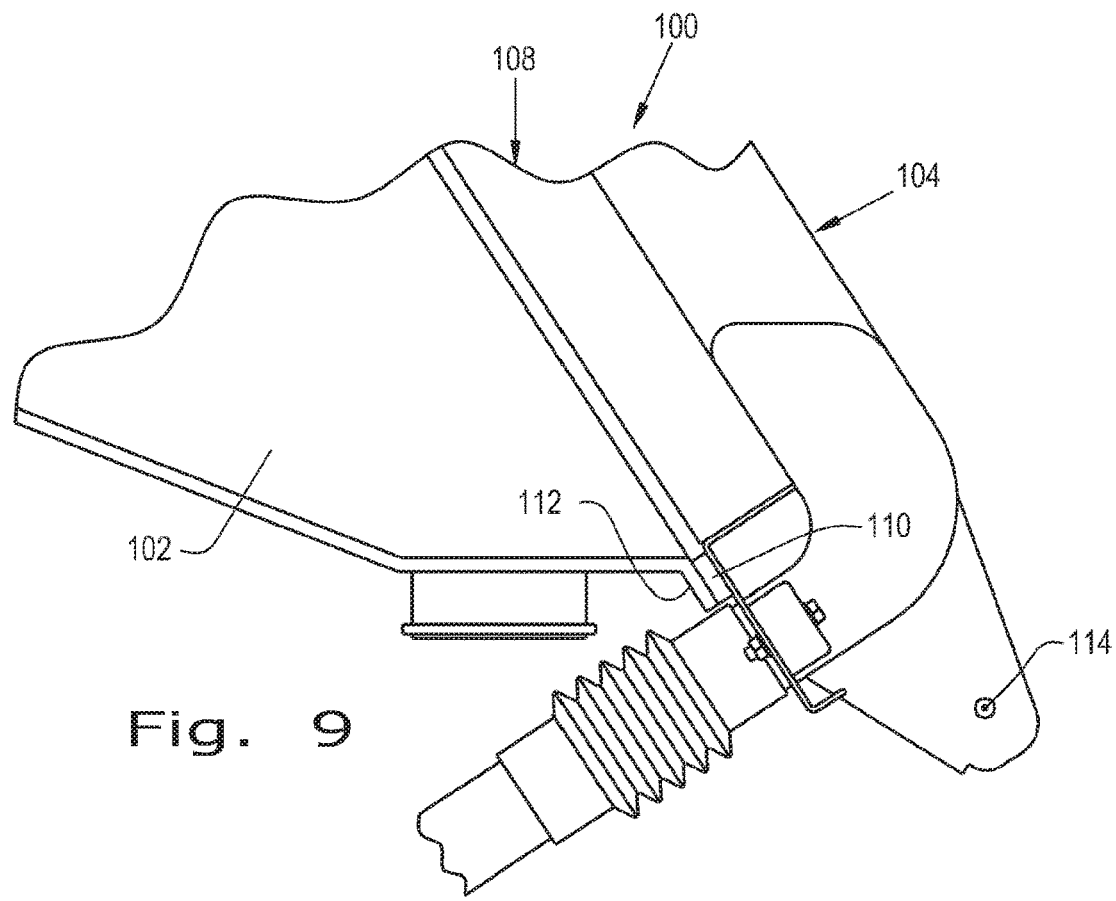
FIG. 9 is a partially fragmented, end view of another embodiment of a cooling package of the present invention.
Figure 10:
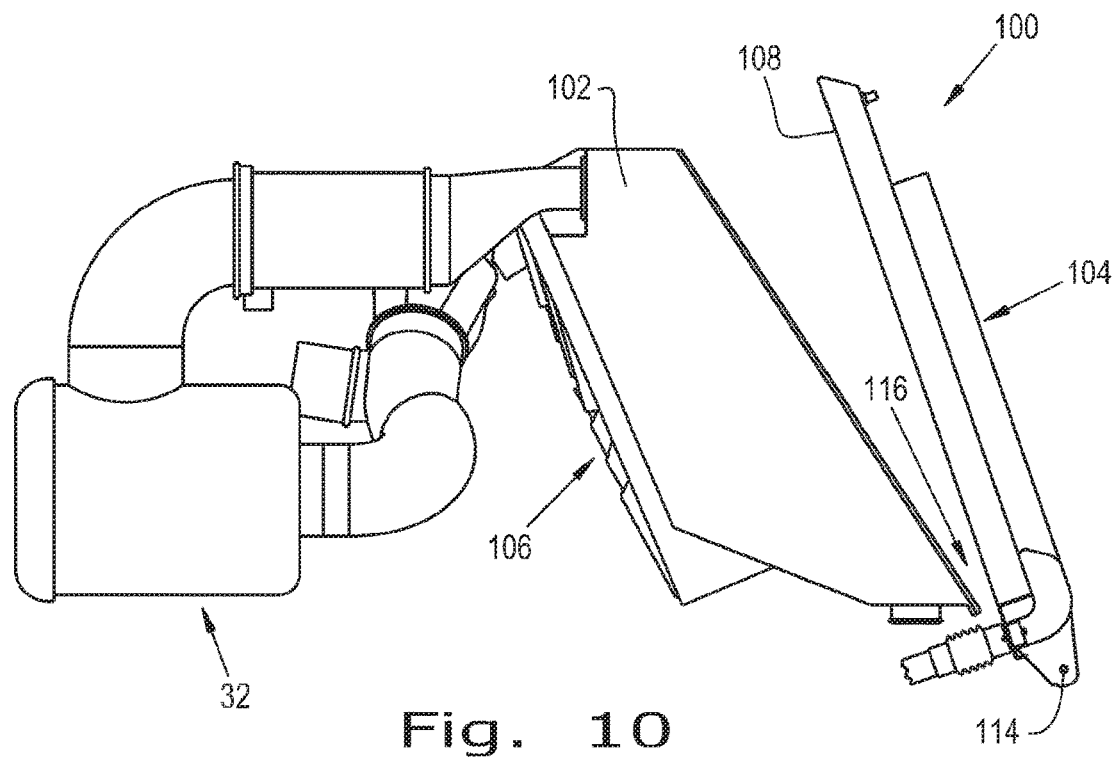
FIG. 10 is a side view of the cooling package shown in FIG. 9, with the door in a partially opened position.

Referring now to FIGS. 9 and 10, there is shown another embodiment of a cooling package 100 which is similar to cooling system 70 shown and described above. Cooling system 100 generally includes a housing 102, and a plurality of cooling units (not specifically shown) arranged in a side-to-side manner within the housing 102. Each cooling unit generally includes a screen 104, a fluid cooler (not specifically shown) within the housing 102, and a fan 106. A door 108 carries the screens 104, and is movable between a closed position (FIG. 9) and an open position (FIG. 10) allowing cleaning by an operator. The door 108 is sealed with the housing 102, and includes a seal 110 which engages with a mating flange 112 on the housing 102 when the door 108 is in the closed position. The door 108 has a hinge axis 114 which is located such that a gap 116 exists between the door 108 and housing 102 to allow debris and other material to fall through the gap 116 for cleaning when the door 108 is in the open position.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural harvester, comprising:
   an internal combustion engine;
   a grain tank; and
   a fluid cooling system for cooling at least one component onboard the agricultural harvester, the fluid cooling system comprises a cooling package positioned between the internal combustion engine and the grain tank, the cooling package comprising a housing, and a plurality of cooling units arranged in a side-to-side manner within the housing, transverse to a fore-aft direction of the harvester;
   wherein each said cooling unit has an inlet with an opening adjacent to and facing forward with respect to a direction of travel of the harvester and toward the grain tank, and an outlet adjacent to the internal combustion engine.

2. The agricultural harvester of claim 1, wherein each of the cooling units includes a screen, a fluid cooler, and a fan.

3. The agricultural harvester of claim 2, wherein each said fluid cooler is fluidly independent from another said fluid cooler.

4. The agricultural harvester of claim 2, wherein each said screen is a rotating screen which is positioned generally vertical or at an acute angle to the vertical.

5. The agricultural harvester of claim 2, wherein each said screen is movable away from the respective cooling unit for cleaning of and access to the respective cooling unit.

6. The agricultural harvester of claim 2, wherein each said fluid cooler comprises:
- a radiator for the internal combustion engine;
- an oil cooler for a hydraulic circuit;
- an intercooler;
- an aftercooler; and
- a heat exchange coil for an air conditioner in an operator cab.

7. The agricultural harvester of claim 2, wherein at least one said fan is configured for reversal of air flow direction through the corresponding cooling unit.

8. The agricultural harvester of claim 2, wherein at least one said fan is configured for providing an air flow used for cleaning an area within the harvester.

9. The agricultural harvester of claim 2, wherein said cooling package comprises a door which is pivotally mounted to said housing and movable between a closed position against the housing and an open position allowing cleaning of an interior of the cooling package.

10. The agricultural harvester of claim 9, wherein the door has a hinge axis arranged to allow the door to swing away from the housing, thereby creating a gap for cleaning when the door is in an at least a partially open position.

11. The agricultural harvester of claim 10, wherein the door is sealed with the housing when the door is in the closed position.

12. The agricultural harvester of claim 1, wherein the agricultural harvester is an agricultural combine.

13. The agricultural harvester of claim 1, further comprising a cross auger disposed at a bottom of the grain tank and an unloading auger, the cross auger being configured to convey clean grain within the grain tank to the unloading auger for discharge from the agricultural harvester.

14. The agricultural harvester of claim 1, wherein the plurality of cooling packages are located rearward of the grain tank and forward of the engine with respect to the fore aft direction of the harvester.

15. The agricultural harvester of claim 1, wherein the inlets of the plurality of cooling packages are oriented in a forward direction with respect to the fore-aft direction of the combine.

16. The agricultural harvester of claim 1, wherein the inlets of the cooling packages are in a parallel orientation.

17. The agricultural harvester of claim 1, wherein the inlets are configured for receiving air from the environment external to the harvester.

18. An agricultural harvester, comprising:
- an internal combustion engine;
- a concave;
- a grain tank; and
- a fluid cooling system for cooling at least one component onboard the agricultural harvester, the fluid cooling system comprises a cooling package positioned between the internal combustion engine and the grain tank, the cooling package comprising a housing, and a plurality of cooling units arranged in a side-to-side manner within the housing, transverse to a fore-aft direction of the harvester;
- wherein each said cooling unit has an inlet adjacent to and facing toward the grain tank, and an outlet adjacent to the internal combustion engine, each of the cooling units includes a screen, a fluid cooler, and a fan;
- wherein at least one fan of the fans in the plurality of cooling unit is configured for reversal of air flow direction through the corresponding cooling unit, and the at least one said fan is configured to direct air flowing in a reverse direction under the grain tank toward an outer surface of the concave for cleaning the concave.

* * * * *